OSCILLOSCOPE NO. 1.

OSCILLOSCOPE NO. 2.

INVENTOR.
JOSEPH F. SPRINGER
BY Fordyce A. Bothwell
ATTORNEY

United States Patent Office 3,324,395
Patented June 6, 1967

3,324,395
APPARATUS INCLUDING NORMALLY SATURATED AMPLIFIER MEANS FOR VISUALLY REPRODUCING CHARACTERISTICS OF TUNNEL DIODES
Joseph F. Springer, Philadelphia, Pa., assignor to Philco Corporation, Philadelphia, Pa., a corporation of Delaware
Filed Dec. 31, 1963, Ser. No. 334,818
6 Claims. (Cl. 324—158)

This invention relates to novel apparatus for determining characteristics of tunnel diodes.

One of the most important characteristics of a tunnel diode is its peak current characteristic. In etched-formed tunnel diodes the peak current characteristic can be controlled with great precision provided suitable means are provided for measuring this parameter. In the past it has been the practice to monitor the characteristic of tunnel diodes during the etching process by means of a curve tracer, but this does not enable accurate determination of the peak current characteristic of a tunnel diode, which is necessary for accurate control of the etching process.

One object of the present invention is to provide an improved apparatus for determining the electrical characteristics of tunnel diodes.

Another object of the invention is to provide an apparatus which is adapted for accurate determination of the peak current characteristic of a tunnel diode.

A further object of the invention is to provide apparatus which enables either observation of the entire voltage-current characteristic of a tunnel diode or observation, on expanded or enlarged scale, of the peak portion of said characteristic.

Apparatus according to the invention comprises a transistor, means for connecting a test tunnel diode in the emitter circuit of the transistor, means for successively operating said diode through a predetermined range of its characteristic, means for applying the voltage across said diode to the horizontal deflection means of an oscilloscope, and means for applying the voltage at the collector to the vertical deflection means of said oscilloscope.

The apparatus further comprises a normally-saturated transistor amplifier stage which is driven out of saturation by the above-mentioned transistor to amplify the peak portion of the tunnel diode's characteristic for presentation on an oscilloscope.

A principle feature of the invention is the high signal level of the current sample while still presenting a low generator impedance to the diode.

Figure 1:
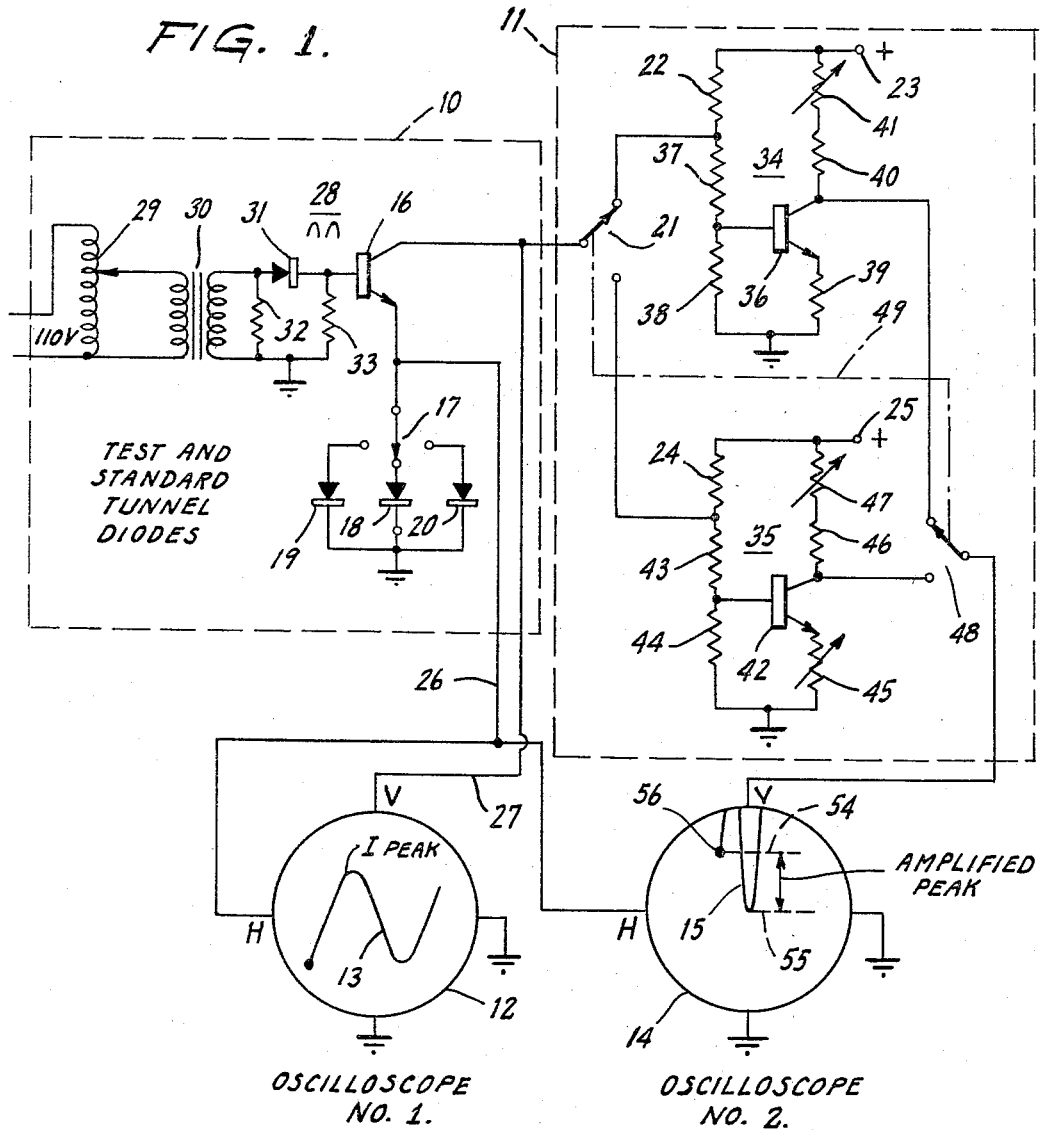
Figure 2:
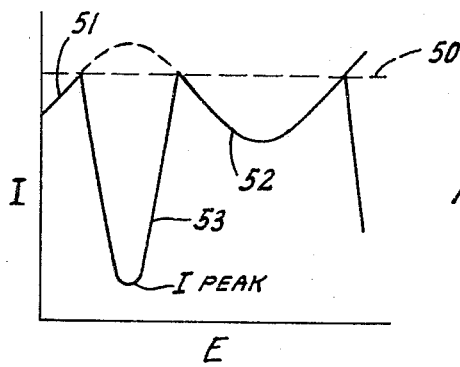

The invention may be fully understood from the following detailed description with reference to the accompanying drawing wherein:

FIG. 1 is a schematic illustration of a preferred embodiment of the invention as it is has been employed in actual practice; and FIG. 2 is a graphic illustration of the vernier measurement function of the present invention.

Referring more particularly to the drawing, the system illustrated in FIG. 1 comprises two sections as represented by the dotted rectangles 10 and 11. Section 10 enables observation on an oscilloscope 12 of the voltage-current characteristic of a test tunnel diode, as shown at 13. The two sections together enable amplification and observation on a second oscilloscope 14 of the peak portion of said characteristic, as shown at 15.

The system illustrated further enables testing of tunnel diodes of two different current ratings, e.g., 5 ma. and 1 ma., with reference to standard tunnel diodes of said ratings.

Section 10 includes a high beta transistor 16 and a selector switch 17 for selective inclusion in its emitter circuit of tunnel diodes 18, 19 and 20 one of which may be a test tunnel diode, such as diode 18, and the others of which may be standard tunnel diodes such as 19 and 20. It will be assumed that the diodes to be tested are diodes having either 1 ma. peak current or 5 ma. peak current, these being two ratings now in current use. If this is the case, diode 19 may be a 1 ma. standard tunnel diode and diode 20 a 5 ma. diode, so that the diode 18 may be tested with reference to a standard tunnel diode of the proper current rating. If diodes of only one current rating are to be tested, the diodes 19 and 20 may be selected to represent upper and lower tolerance limits or, alternatively, only one may be a standard diode and the other may be a second test diode. As a further alternative, the circuit may be adjusted using a standard diode and then the standard diode may be removed and the test diodes checked in groups of three.

The collector circuit of transistor 16 is completed through a two-position switch 21 according to the diode rating. For a 5 ma. diode, switch 21 is placed in its upper position and the collector circuit is then completed through a load resistor 22 to positive voltage terminal 23. For a 1 ma. diode, switch 21 is placed in its lower position and the collector circuit is then completed through a load resistor 24 (which may have a resistance greater than that of resistor 22) to positive voltage terminal 25.

The emitter of transistor 16 is connected through connection 26 to the horizontal deflection input of both of the oscilloscopes 12 and 14. The collector of transistor 16 is connected through connection 27 to the vertical deflection input of oscilloscope 12.

As represented at 28, successive half sine waves of voltage are applied to the base of transistor 16. These are derived from an alternating current source by means of a conventional half wave rectifier circuit arrangement comprising variable transformer 29, transformer 30, diode rectifier 31, and resistors 32 and 33. The half sine waves sweep the tunnel diode through a predetermined range of its characteristic, and the voltage across the tunnel diode is applied over connection 26 to the horizontal deflection means of oscilloscope 12. Since transistor 16 has high beta, its collector current is substantially a replica of the tunnel diode current and its collector voltage accurately represents the current variation. This voltage is applied over connection 27 to the vertical deflection means of oscilloscope 12.

In this arrangement the tunnel diode connected in the emitter circuit acts like the load of an emitter follower. The transistor provides sufficiently low impedance $$\left(\approx \frac{R_{33}}{\beta}\right)$$

to prevent the tunnel diode from going into oscillation. Due to the voltage gain provided by the transistor, the signal voltage at the collector (which is determined by the collector resistor) has an amplitude of several volts, typically 6 volts, peak when the tunnel diode, either 1 ma. or 5 ma., is within specifications. This enables the use of a low-gain oscilloscope.

As thus far described, the system enables observation of the voltage-current characteristic of a tunnel diode in comparison to the characteristic of a standard tunnel diode. With switch 21 in its proper position according to the current rating of the tunnel diode to be tested, the operator simply manipulates switch 17 and observes comparatively on the screen of oscilloscope 12 and the characteristics of the test tunnel diode and the standard tunnel diode.

However as stated at the outset, for some purposes this does not enable a sufficiently accurate determination of the peak current of the test tunnel diode, and for this purpose section 11 of the illustrated apparatus is employed. This section comprises two normally-saturated transistor amplifier stages 34 and 35 for use with the 5 ma. and 1 ma. tunnel diodes, respectively. Stage 34 comprises a transistor 36, resistors 37 and 38 which form a voltage divider to maintain the transistor normally in saturation, an emitter resistor 39, and collector load resistors 40 and 41, the latter being adjustable. Stage 35 comprises a transistor 42, resistors 43 and 44 forming a voltage divider to maintain the transistor normally in saturation, an adjustable emitter resistor 45, and collector load resistors 46 and 47, the latter being adjustable. A two-position switch 48 enables selective connection of the collectors of transistors 36 and 42 to the vertical deflection means of oscilloscope 14. The switches 21 and 48 are preferably ganged together, as indicated by dot and dash line 49, for example by employing a double-pole double-throw switch to constitute the two switches 21 and 48.

As shown by the waveform of FIG. 2, which represents the current through resistor 40 or 46, for input signal levels to amplifier 34 or 35 which are below the saturation level represented by broken line 50, amplifier 34 or 35 acts as an attenuator or voltage divider and produces no inversion of the input signal. Thus portions 51 and 52 of the waveform of FIG. 2 are attenuated versions of corresponding portions of the waveform 13 of FIG. 1. However, for signal amplitudes which drive amplifier 34 or 35 out of saturation, the input signal is inverted and amplified in the normal fashion, producing the negative-going peak 53 which corresponds to the positive-going peak of waveform 13 of FIG. 1.

The system parameters may be chosen so as to enable observation on the same scale of the peak portion of the characteristics of both 5 ma. and 1 ma. tunnel diodes. The procedure for adjusting and calibrating the system is as follows: The 5 ma. circuit 34 is adjusted first. This is done by first placing switch 17 in its right-hand position and placing switches 21 and 48 in their upper position as shown, and then using successively as the diode 20 a 4.9 ma. standard tunnel diode and 5.1 ma. standard tunnel diode, adjusting resistor 41 and the sensitivity of oscilloscope 14 to obtain the desired difference in deflection between the two extreme tolerances. The screen of oscilloscope 14 may be provided with suitable reference marks 54 and 55 to indicate the portion of peak 15, which corresponds to the tip of peak 53 of FIG. 2, for these two limits. Then the 1 ma. circuit 35 is adjusted. This is done by first placing switch 17 in its left-hand position and placing switches 21 and 48 in their lower position. Then with a 1 ma. standard diode connected as the diode 19, resistor 47 is adjusted to set the amplitude of the trace on oscilloscope 14 to a position midway between the reference marks 54 and 55. The sensitivity of the oscilloscope has already been adjusted, and therefore it is left as it is. The variable resistor 45 is adjusted to aline the D.C. reference level of the 1 ma. circuit with the 5 ma. circuit. The reference level can be recognized by a bright spot 56 at the initiation of the trace.

With the system thus adjusted, a test tunnel diode of either 5 ma. or 1 ma. current rating, connected as the diode 18, can be easily tested simply by proper positioning of the switches. In operation the transistor amplifier stage 34 or 35, which ever happens to be in use, is normally in saturation but is driven out of saturation by the peak portion of the voltage at the collector of transistor 16. The amplifier stage amplifies the peak portion and it is visually produced on oscilloscope 14. This of course represents the peak current of the test diode amplified for accurate determination of the peak current.

In a physical embodiment of the illustrated system, with an operating voltage of twelve volts at terminals 23 and 25, the elements have values as follows:

| Resistor | Value |
| --- | --- |
| Resistor 22 | 1.2K |
| Resistor 24 | 6K |
| Resistor 32 | 10 ohms |
| Resistor 33 | 10 do |
| Resistor 37 | 10K |
| Resistor 38 | 10K |
| Resistor 39 | 2.2K |
| Resistor 40 | 3.3K |
| Resistor 41 | 50K |
| Resistor 43 | 39K |
| Resistor 44 | 39K |
| Resistor 45 | 10K |
| Resistor 46 | 15K |
| Resistor 47 | 100K |

While the invention has been illustrated and described with reference to a preferred embodiment, it will be understood that the invention is not limited thereto, but contemplates such modifications and further embodiments as may occur to those skilled in the art.

I claim:

1. Apparatus for determining peak current of a tunnel diode, comprising a transistor having a base, an emitter and a collector, a common emitter circuit, means for connecting said diode in said circuit, a collector circuit including a load impedance and a source of operating voltage, means connected to said base and to said emitter circuit for successively operating said diode through a predetermined range of its characteristic, a normally-saturated transistor amplifier stage, means for connecting the input of said stage to said collector so that said stage is driven out of saturation by the peak portion of the voltage at said collector, an oscilloscope having horizontal and vertical deflection means, means for applying the voltage across said diode to said horizontal deflection means, and means for applying the voltage output of said stage to said vertical deflection means.

2. Apparatus for determining peak current of a test tunnel diode with reference to the peak current of a standard tunnel diode, comprising a transistor having a base, an emitter and a collector, a common emitter circuit, means for selectively connecting said diodes in said circuit, a collector circuit including a load impedance and a source of operating voltage, means connected to said base and to said emitter circuit for successively operating the connected diode through a predetermined range of its characteristic, a normally-saturated transistor amplifier stage, means for connecting the input of said stage to said collector so that said stage is driven out of saturation by the peak portion of the voltage at said collector, an oscilloscope having horizontal and vertical deflection means, means for applying the voltage across the connected diode to said horizontal deflection means, and means for applying the voltage output of said stage to said vertical deflection means.

3. Apparatus for determining peak current of a tunnel diode, comprising a transistor having a base, an emitter and a collector, means for connecting said diode between said emitter and a point of fixed reference potential, a collector circuit including a load impedance and a source of operating voltage, means for applying successive half sine waves of voltage between said base and said point of fixed reference potential, a normally-saturated transistor amplifier stage, means for connecting the input of said stage to said collector so that said stage is driven out of saturation by the peak portion of the voltage at said collector, an oscilloscope having horizontal and vertical deflection means, means for connecting said emitter to said horizontal deflection means, and means for connecting the output of said stage to said vertical deflection means.

4. Apparatus for determining peak current of a test tunnel diode, comprising a transistor having a base, an emitter and a collector, means for selectively connecting said diode and a standard tunnel diode between said emitter and a point of fixed reference potential, a collector circuit including a load impedance and a source of operating voltage, means for applying successive half sine waves of voltage between said base and said point of fixed reference potential, a normally-saturated transistor amplifier stage, means for connecting the input of said stage to said collector so that said stage is driven out of saturation by the peak portion of the voltage at said collector, an oscilloscope having horizontal and vertical deflection means, means for connecting said emitter to said horizontal deflection means, means for connecting the output of said stage to said vertical deflection means, and means for adjusting said stage with said standard diode connected preparatory to the testing of said test diode.

5. Apparatus for the testing of tunnel diodes having two different current ratings, comprising a transistor having a base, an emitter and a collector, means for selectively connecting test and standard tunnel diodes between said emitter and a point of fixed reference potential, means for applying successive half sine waves of voltage between said base and said point of fixed reference potential, a pair of transistor amplifier stages adapted respectively for use in the testing of the differently rated diodes, means for selectively connecting the inputs of said stages to said collector, each of said stages being adjustable so as to be normally saturated but to be driven out of saturation by the peak portion of the voltage at said collector, an oscilloscope having horizontal and vertical deflection means, means for connecting said emitter to said horizontal deflection means, and means for selectively connecting the outputs of said stages to said vertical deflection means.

6. Apparatus for amplifying and visually reproducing a portion of the voltage-current characteristic of a tunnel diode, comprising means coupled to said tunnel diode for producing a first voltage representative of the voltage across said tunnel diode and a second voltage representative of current through said tunnel diode for different values of said first voltage, an oscilloscope having first and second sets of deflection means, means for applying said first voltage to said first set of deflection means, a transistor amplifier stage, means for applying said second voltage to the input of said stage, means for maintaining said stage saturated for a first range of amplitudes of the input signal thereto and unsaturated for peak amplitude excursions of said input signal thereto, and means for applying the voltage output of said stage to said second set of deflection means.

References Cited

UNITED STATES PATENTS 3,104,343  9/1963  McGrogan _____ 324—158 X

OTHER REFERENCES

ABC's of Tunnel Diodes (Peter Galaan), H. W. Sams Publication, October 1962, pp. 68–69.

RUDOLPH V. ROLINEC, *Primary Examiner.*

E. L. STOLARUN, *Assistant Examiner.*